Figure 1:
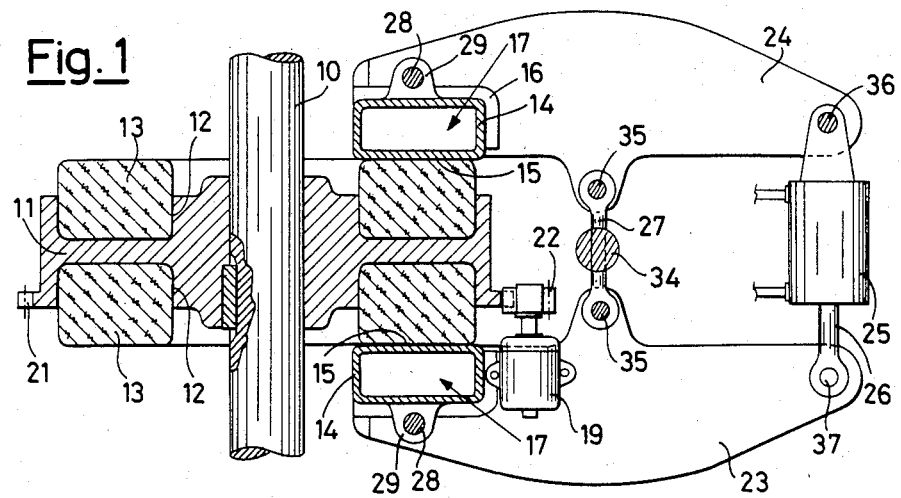

United States Patent [19]

Cigognini

[11] Patent Number: 4,508,200
[45] Date of Patent: Apr. 2, 1985

[54] HIGH PERFORMANCE DISC BRAKE

[75] Inventor: Silvio Cigognini, Milan, Italy

[73] Assignee: Socimi, S.p.A., Milan, Italy

[21] Appl. No.: 472,410

[22] Filed: Mar. 4, 1983

[30] Foreign Application Priority Data

Mar. 10, 1982 [IT] Italy ................... 20081 A/82

[51] Int. Cl.³ ............................... F16D 65/853
[52] U.S. Cl. ................... 188/264 P; 188/71.6; 188/72.9; 192/113 B
[58] Field of Search .............. 188/264 P, 264 D, 71.6, 188/72.9; 192/113 B

[56] References Cited

U.S. PATENT DOCUMENTS

| | | | |
|---|---|---|---|
| 1,972,353 | 9/1934 | North et al. | 188/264 D |
| 2,788,870 | 4/1957 | Heck | 188/264 P |
| 2,821,271 | 1/1958 | Sanford | 188/264 D |
| 2,911,071 | 11/1959 | Gelleke | 188/72.9 X |
| 2,940,556 | 6/1960 | Jensen et al. | 188/264 D |
| 2,986,238 | 5/1961 | Eaton | 192/113 B X |
| 3,022,867 | 2/1962 | Maloney et al. | 188/264 P |
| 3,730,301 | 5/1973 | Heck et al. | 188/264 P X |
| 3,850,267 | 11/1974 | Odier | 188/71.6 |
| 4,014,410 | 3/1977 | Bryant | 188/264 P X |
| 4,066,152 | 1/1978 | Pascal | 188/72.9 X |
| 4,374,552 | 2/1983 | Dayen | 188/72.9 |

FOREIGN PATENT DOCUMENTS

| | | | |
|---|---|---|---|
| 897212 | 10/1955 | Fed. Rep. of Germany | 188/264 D |
| 2309330 | 9/1973 | Fed. Rep. of Germany | 188/264 D |
| 2421351 | 12/1974 | Fed. Rep. of Germany | 188/264 D |
| 846348 | 7/1981 | U.S.S.R. | 188/264 P |

Primary Examiner—George E. A. Halvosa
Attorney, Agent, or Firm—Sheridan Neimark; Barry A. Edelberg

[57] ABSTRACT

A disc brake for application to any land, air or sea vessel or to any fixed or mobile industrial machine, which in order to attain high braking performance comprises a rotating part mounted on a shaft to be braked and having at least one surface of low coefficient of thermal conductivity, whereas the stationary part is of a material of high coefficient of thermal conductivity and is provided with internal cavities for a fluid for dissipating the braking heat, which passes almost totally to the stationary part.

14 Claims, 2 Drawing Figures

HIGH PERFORMANCE DISC BRAKE

This invention relates to a high performance disc brake.

A disc brake is known to comprise a rotating part constituted by a brake disc mounted on the shaft to be braked, a stationary part constituted by a braking caliper, and control means associated with said stationary part in order to bring it into sliding contact with a surface of said disc.

In known disc brakes, the brake disc mounted on the shaft to be braked in generally formed from two rings which are subjected to wear and which are joined together by a series of fins which form the disc body into a single piece and produce a forced circulation of air for cooling the disc when, during braking, the kinetic energy of the mass to be braked is totally transformed into heat by the effect of the friction produced by the sliding contact between the surfaces of the friction pads fixed to the caliper and the surfaces of the disc.

In these known disc brakes, the brake disc is always of metal, in particular steel or cast iron, and therefore has a high coefficient of thermal conductivity, whereas the friction pads are of a material having a low coefficient of thermal conductivity.

The heat into which the kinetic energy is transformed during braking is thus stored and is then dissipated almost entirely by the brake disc which transfers it to the air of the surrounding environment by virtue of the temperature difference which arises between the disc and the air at the end of each braking operation, whereas the friction pads fixed to the caliper do not contribute in any appreciable manner to heat dissipation because of the fact that their coefficient of thermal conductivity is much lower than that of the metal with which the disc is formed.

Brake discs of this known type have a well determined limit to their performance, this limit being determined by the maximum temperature level attainable by the disc, beyond which the disc is exposed to unacceptable thermal hardening and the characteristics of the friction pads begin to decay, with the possibility of burning of the pads and a consequent abnormal and/or reduced braking force.

This eventuality even further worsens the performance of the disc if at the beginning of each successive braking operation, the disc has not yet totally dissipated the heat accumulated during each preceding braking operation. This leads to a continuous increase in the disc temperature in the case of repeated braking, and thus a more rapid attainment of the maximum temperature level, at which the temperature difference between the disc and the surrounding air is such as not to enable all the stored heat to be dissipated, i.e. a condition of substantial thermal equilibrium exists.

Thus it can be stated that both in the case of single braking (such as with disc brakes for aeroplanes), and in the case of repeated braking, which can occur either at very short time intervals (such as in the case of brakes for competition automobiles and motor cycles), at short time intervals (such as in the case of brakes for urban public transport vehicles, for example underground trains, trams, motor buses, trolley buses etc.), or at medium or long time intervals (such as in the case of brakes for railway vehicles and automobiles travelling outside town), the sizing of a brake disc is always determined on the one hand by the need to obtain the required severe performance and on the other hand by the opposing need to reduce the size of the brake disc because of the increasingly reduced spaces which are available.

Thus in known disc brakes, either the braking power is low or, if higher braking powers are required, high temperatures are attained to the detriment of the safety, efficiency and lift of the brakes, which usually constitute the vital member of the machine on which they are mounted.

A further typical disadvantage of known disc brakes comprising a one-piece disc is that, for example when applied to railway vehicles or the like, a worn brake disc can only be replaced with a new one by removing the wheels and disc from the axle and then refixing the new disc and the wheels.

The object of the present invention is therefore to provide a disc brake which obviates the limitations and drawbacks of disc brakes of known type of providing a performance, i.e. braking power, which is considerably better than any known type of disc brake independently of the application for which it is intended, and which can include any type of railway, tramway, road, aeronautical or naval vehicle, or any type of industrial machine of fixed to mobile installation which requires a brake.

This object is attained according to the invention by a disc brake characterised in that the rotating part comprises at least one surface of low coefficient of thermal conductivity, and that the stationary part is of a material of high coefficient of thermal conductivity and is provided with heat dissipation means.

The rotating part can be constituted by a disc carrying a friction pad on at least one of its faces, or alternatively can be constructed directly of a material of low coefficient of thermal conductivity. The stationary part can be constituted by at least one metal braking head.

The invention therefore proposes in a manner of speaking to reverse the parts in the conception of the disc brake by causing the heat produced during braking to be stored and dissipated not by the rotating part, as in the case of known disc brakes, but by the stationary part.

The new conception of the disc brake according to the invention enables the braking power of the brake to be considerably increased, mainly because of its characteristic of possessing a very high heat capacity and reserve, in that the metal braking head or heads which store practically all the braking heat, being stationary, can comprise a radiant surface fitted with fins of practically unlimited extension and/or cavities of internal ducts suitble for the forced circulation of any cooling fluid.

This characteristic is attained not only by virtue of the high capacity of the disc brake for dispersing heat, but also by virtue of the fact that the heat can be continuously extracted, and above all at the most critical moment, i.e. on termination of the braking operation, at which ventilation ceases in the case of brake discs of known type and the highest temperatures occur which are responsible for the thermal hardening of the disc and the burning of the friction pads. In this manner, optimum braking performance is ensured, and allowing higher speeds for larger masses to be braked, and a larger number of braking operations per unit of time.

Figure 2:
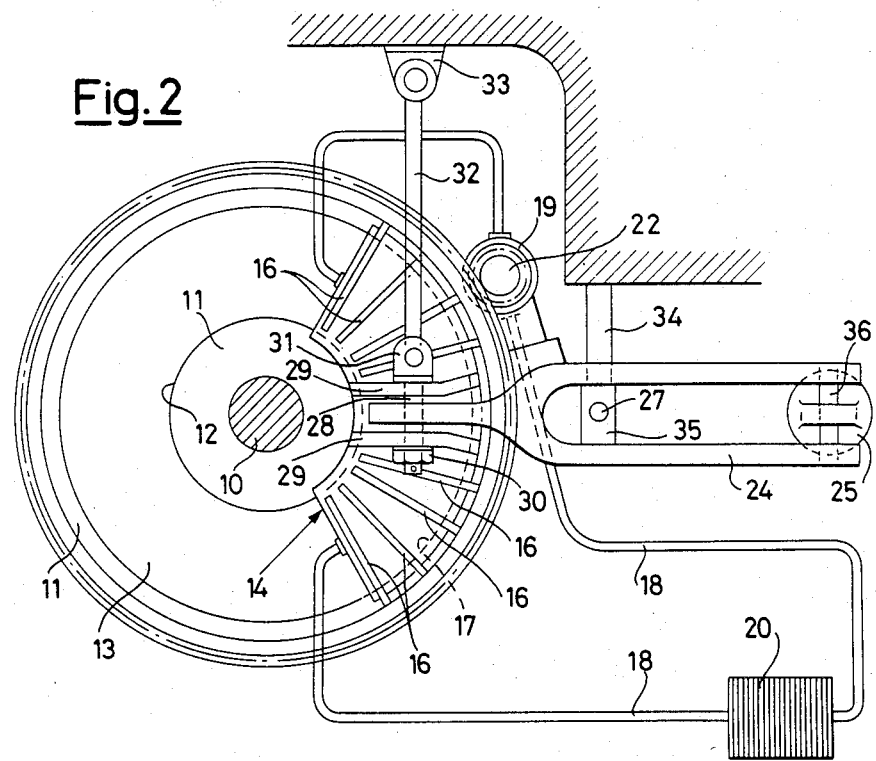

These and further characteristics of the disc brake according to the invention and the numerous advantages deriving therefrom will be more apparent from the description of one embodiment given by way of non-limiting example hereinafter and illustrated diagrammatically on the accompanying drawings, in which FIG. 1 is a plan view of the disc brake according to the invention shown partly in section on a plane passing through the axis of the shaft with which the brake is associated, and FIG. 2 is an elevational view of the disc brake of FIG. 1.

On the drawings, the reference numeral 10 indicates the shaft to be braked. On the shaft 10 there is mounted a disc 11 which in the case illustrated is in one piece, but which could be constructed for example in two or more sectors. The disc 11 can be mounted on the shaft 10 in any convenient manner, for example by forced keying or other conventional systems.

In both its faces, the disc 11 comprises seats 12 in which annular friction pads 3 of a material having a low coefficient of thermal conductivity are located project from and are suitably fixed. These can be in the form of whole rings or rings divided into two or more sectors. The friction pads 13 can be fixed into their respective seats 12 in the disc 11 by any of the suitable possible fixing systems of known type, these not being illustrated in detail.

A braking head 14 is arranged to cooperate with each of the friction pads 13 carried by the disc 11. In the case illustrated, each braking head 14 is constituted by a body in the form of a circular ring sector having an annular extension of about 120°, but this is not binding. In this respect, as determined by requirements, heads can be provided which are in one or more sectors having an angular extension of less than 120° or greater than 120°, up to an extension of 360° to cover the entire annular surface of the disc 11. The circular ring sector form of the heads is also not binding, and the heads 14 can have any form suitable for dissipating the braking heat.

The heads 14 comprise braking surfaces 15 which face the annular friction pads 13 of the disc 11, and are designed to be brought into sliding contact with them in order to exert the braking force.

The braking heads are of a material having a high coefficient of thermal conductivity, and preferably of metal such as aluminium alloys.

In the case illustrated, the braking heads 14 are provided both with external fins 16 and with an internal cavity 17 for circulating a cooling fluid, but it is possible to provide only one of these heat dissipation means, depending upon the particular case. The chosen material of construction of the heads must possess high thermal conductivity both towards the surrounding air and towards any cooling liquid passing through its inner cavity or through suitable internal ducts.

A circuit indicated by 18 and comprising a circulation pump 19 and heat exchanger 20 is provided for the forced circulation of the cooling fluid through the inner cavity 17 of each braking head 14.

In the case illustrated, the pump 19 is operated by peripheral toothing 21 on the disc 11, with which the pinion 22 mounted on the pump shaft engages. However, if it is desired to operate the pump independently of the rotation of the disc 11, i.e. of the shaft 10, its drive can be electric, hydraulic or of any other type. In such a case, depending on the braking performance required, the pump can be kept operating either continuously or intermittently, this latter being attained according to requirements, for example by means of a temperature control installed in the cooling fluid circuit.

The heat exchanger 20 can be of the single or multiple unit type. It can be installed in any part of the vehicle or machine on which the brake is mounted. One possible advantageous installation location for the heat exchanger is inside the vehicle or in the environment in which the machine is located, in which case it can be used as a heater during cold seasons. In such a case, during hot seasons the cooling fluid can be branched to another circuit in order to circulate through one or more heat exchangers disposed outside the vehicle or outside the environment in which the machine is located, or alternatively the fluid can be fed to the thermal unit of an air conditioning system of evaporation type. The cold of such a system can also be used for cooling the braking head cooling fluid.

In this manner it is possible to recover and utilise the heat energy which would otherwise be lost.

In order to control the approach and withdrawal of the braking heads 14 to and from the friction pads 13 of the disc 11, so as to produce or suppress the sliding contact between their surfaces 15 and the facing surfaces of the pads, there is provided a caliper in the form of two half-members 23, 24, the braking heads 14 being hinged to one of their ends, whereas between their other ends there acts a control member shown as a pneumatic or hydraulic cylinder 25, but which could consist also of other means such as an electromagnet. As shown in FIG. 1, the cylinder 25 is pivoted at 36 to the half-member 24, while its rod 26 is pivoted at 37 to the half-member 23. In an intermediate position, the two half-members 23, 24 are connected together by a tie bar 27 which at its ends carries hinge pins 35. The hinging between each half-member 23 and 24 and the relative braking end 14 is made by means of a pin 28 which passes through two lugs 29 on the head 14 and the end of the half-member, which is inserted between said lugs 29 (see FIG. 2). On the lower end of the pin 28 there is screwed a nut 30 which can be locked by a cotter pin, while the other end of said pin 28 is rigid with a lug 31 to which is hinged a tie bar 32 for suspending the braking head 14 and the relative half-member of the caliper from a fixed part 33 of the vehicle or machine. The half-members 23, 24 are also suspended from the fixed part 33 by means of a support 34 at the connection tie bar 27.

From the aforegoing description, in applying the disc brake illustrated on the drawings it is apparent that the axis of the shaft 10 to be braked is horizontal, the brake disc 11 rotates in a vertical plane, and the two braking heads 14 are also disposed in parallel vertical planes.

In order to exert a braking force on the disc 11, the cylinder 25 is made to mutually withdraw the ends of the caliper halfmembers 23, 24 between which said cylinder acts, so leading to the mutual approach of the other ends of the half-members to which the braking heads 14 are hinged, these thus becoming pressed against the annular friction pads 13 of the disc 11. It should be noted that the half-members 23, 24 are made to rotate about the hinge pins 35 of the connection tie bar 27, and the force exerted by the cylinder 25 during the braking operation is multiplied by the ratio of the distance between the pins 35 and 36 (or 35 and 37) to the distance between the pins 35 and 28, to act at the centre of gravity of the contact surfaces 15 of the braking heads 14.

Only a minimum portion of the heat produced during braking passes to the friction pads 13 of the brake disc 11, whereas most of it passes to the braking heads 14, which thus absorb the heat and dissipate it partly into the environment by virtue of the presence of the fins 16. A further fraction of the heat is removed from the braking heads 14 by the circulation of the cooling fluid through their cavities 17 by virtue of the pump 19. As stated, in the case illustrated this pump operates only when the shaft 10 and disc 11 rotate, but if higher braking performance is required it is possible to operate the pump 19 continuously, independently of the rotation of the brake disc 11.

It should be noted that the pump 19 is suitably mounted on one of the half-members 23, 24 of the caliper (on the half-member 23 in the case illustrated).

As is apparent from the aforegoing description, the main characteristic of the disc brake according to the invention is that the function of storing and dissipating the heat produced during braking is no longer performed by the rotating part (disc) of the brake, but is performed instead by the stationary part (braking heads). Numerous advantages derive therefrom in terms of braking performance, life, safety and efficiency of the brake.

These advantages are due to the fact that in contrast to the rotating part, the stationary part of the brake can be easily configured and dimensioned for storing the braking heat, as determined by the applicational requirements of the brake, and can also be provided with the most suitable means for dispersing the stored heat. Compared with disc brakes of known type, the sliding contact members operate constantly at a relatively lower temperature for an equal heat storage mass. The wear of the rotating part of the brake does not reduce the capacity for storing heat (as this function is not performed by the rotating part), and wear of the stationary part does not compromise the brake performance, considering the efficiency of the means for dissipating the heat from the stationary part, which means can be active precisely at the most critical moment, i.e. on termination of the braking operation, and can be made to operate either continuously or intermittently, for example under temperature control in accordance with the temperature of the cooling fluid for the stationary part.

The fact that the brake disc of the brake according to the invention always operates at low temperature also obviates the known reliability problems regarding its mounting on the shaft to be braked, which in known brakes are related to the phenomenon of thermal expansion of the disc which can cause possible slip between the disc and shaft.

The brake disc can remain permanently fixed on the shaft to be braked without ever being removed and without requiring the removal of other members, and the wear members (friction pads) can be replaced with maximum ease.

When the metal braking heads have been worn to their maximum extent, they can also be easily removed and replaced. As already stated, the brake disc could also be constructed directly of a material having a low coefficient of thermal conductivity, in which case the friction pads are dispensed with, and the disc can be mounted on the shaft by means of a simple bush.

With the disc brake according to the invention it is possible to recover the braking energy in the form of heat which, if for example the brake is mounted on a vehicle, can be used for internal heating during cold seasons by means of heaters fed by the cooling fluid from the braking heads. In the hot season, the heat can be dissipated to the heat exchanger by suitably deviating the flow of cooling fluid using appropriate cocks.

The caliper which controls the braking heads can itself be used as the heat exchanger by suitably configuring its half-members and possibly providing them with fins and cavities and/or internal ducts for the forced circulation of the cooling fluid.

Numerous modifications can be made to the disc brake according to the invention, other than those already mentioned. Thus for example, the caliper can be constituted by any mechanical or hydraulic system which is either a force multiplier or non-multiplier and is able to produce the necessary braking force at the contact surfaces 15 between the braking heads 14 and the friction pads 13.

Further modifications within the range of the expert of the art can be made without leaving the scope of protection of the present invention.

I claim:

1. A disc brake to be mounted on a motor vehicle, said disc brake comprising:
    (a) a rotating part, which comprises:
        a shaft;
        a disc, having a seat in at least one of its faces, mounted on said shaft;
        an annular friction pad fixed in and projecting from said seat; and
    (b) a stationary braking part which comprises:
        at least one metal braking head of a high coefficient of thermal conductivity;
        a caliper including pivotal members attached to said metal braking head; and
        cooling fluid;
        said metal braking head having at least one cavity or duct for the passage of said cooling fluid, said cavity or duct being connected into a cooling circuit communicating with said cavity or ducts, said cooling circuit including a circulation pump fixed on one of said pivotal members, said pump having a pump shaft, and a heater within the interior of the vehicle, said brake disc being provided with peripheral toothing into which a pinion fixed on said pump shaft engages to drive said pump, heat from said metal braking head being dissipated to said cooling fluid located in said cavity or ducts, said cooling fluid circulating within said cooling circuit, said cooling circuit also including a means for directing at least a portion of said coolant fluid into said heater wherein heat from said fluid is dissipated through said heater to the interior of said motor vehicle.

2. A disc brake as claimed in claim 1, characterised in that the annular friction pad is divided into several sectors.

3. A disc brake as claimed in claim 1, characterised in that the disc forming the rotating part is at least partly of a material of low coefficient of thermal conductivity.

4. A disc brake as claimed in claim 1, characterised in that the disc forming the rotating part is constituted by a plurality of sectors.

5. A disc brake as claimed in claim 1, characterised in that the braking head is of aluminum alloy.

6. A disc brake as claimed in claim 1, characterised in that the braking head is constituted by a body in the form of a circular ring sector.

7. A disc brake as claimed in claim 1, characterised in that the braking head is provided with finning.

8. A disc brake as claimed in claim 1, characterised in that the braking head is constituted by several sectors.

9. A disc brake as claimed in claim 1, characterised in that two opposing braking heads are provided, which can be controlled by a control member by way of an intermediate system.

10. A disc brake as claimed in claim 9, characterised in that said intermediate system is a force multiplier.

11. A disc brake as claimed in claim 10, characterised in the the intermediate system is constituted by said pivoted members comprising two half-members which are connected together at an intermediate point, the braking heads being pivoted to said half-members at one of their ends, whereas the control member acts between their other ends.

12. A disc brake as claimed in claim 9, characterised in that the control member is constituted by at least one cylinder of hydraulic or pneumatic type.

13. A disc brake as claimed in claim 9, characterised in that the control member is constituted by an electromagnet.

14. The disc brake of claim 1, wherein said cooling circuit further comprises a heat exchanger outside of said vehicle into which cooling fluid may be branched.

* * * * *